(12) United States Patent
Keenan et al.

(10) Patent No.: US 11,740,598 B2
(45) Date of Patent: Aug. 29, 2023

(54) APPARATUS AND METHODS TO BUILD A RELIABLE DEEP LEARNING CONTROLLER BY IMPOSING MODEL CONSTRAINTS

(71) Applicant: AspenTech Corporation, Bedford, MA (US)

(72) Inventors: Michael R. Keenan, Houston, TX (US); Qingsheng Quinn Zheng, Sugar Land, TX (US)

(73) Assignee: ASPENTECH CORPORATION, Bedford, MA (US)

( * ) Notice: Subject to any disclaimer, the term of this patent is extended or adjusted under 35 U.S.C. 154(b) by 154 days.

(21) Appl. No.: 17/246,245

(22) Filed: Apr. 30, 2021

(65) Prior Publication Data
US 2022/0365497 A1 Nov. 17, 2022

(51) Int. Cl.
*G05B 13/04* (2006.01)
*G05B 13/02* (2006.01)
*G06N 3/044* (2023.01)

(52) U.S. Cl.
CPC ......... *G05B 13/048* (2013.01); *G05B 13/027* (2013.01); *G06N 3/044* (2023.01)

(58) Field of Classification Search
CPC ............................ G05B 13/048; G05B 13/027
USPC ....................................................... 700/30
See application file for complete search history.

(56) References Cited

U.S. PATENT DOCUMENTS

| 9,715,221 | B2 | 7/2017 | Zheng et al. |
| 11,474,508 | B2 | 10/2022 | Andreu et al. |
| 2009/0319059 | A1* | 12/2009 | Renfro ................... G05B 17/02 700/30 |

(Continued)

FOREIGN PATENT DOCUMENTS

| EP | 1571509 A1 | 12/2004 |
| WO | 9222021 | 12/1992 |

(Continued)

OTHER PUBLICATIONS

International Search Report and Written Opinion for PCT/US2022/071927 dated Aug. 5, 2022.

(Continued)

*Primary Examiner* — Jigneshkumar C Patel
(74) *Attorney, Agent, or Firm* — Hamilton, Brook, Smith & Reynolds, P.C.

(57) ABSTRACT

Deep learning models and other complex models provide accurate representations of complex industrial processes. However, these models often fail to satisfy properties needed for their use in closed loop systems such as Advanced Process Control. In particular, models need to satisfy gain-constraints. Methods and systems embodying the present invention create complex closed-loop compatible models. In one embodiment, a method creates a controller for an industrial process. The method includes accessing a model of an industrial process and receiving indication of at least one constraint. The method further includes constructing and solving an objective function based on at least one constraint and the model of the industrial process. The solution of the objective function defines a modified model of the industrial process that satisfies the received constraint and can be used to create a closed-loop controller to control the industrial process.

27 Claims, 7 Drawing Sheets

(56) References Cited

U.S. PATENT DOCUMENTS

| | | | | |
|---|---|---|---|---|
| 2014/0330402 | A1* | 11/2014 | Keenan | G05B 13/04 700/31 |
| 2016/0147202 | A1 | 5/2016 | Nandigam et al. | |
| 2017/0205809 | A1* | 7/2017 | Sayyarrodsari | G05B 13/048 |
| 2019/0243320 | A1* | 8/2019 | Quirynen | G05B 13/048 |
| 2021/0034023 | A1 | 2/2021 | Keenan et al. | |
| 2022/0035353 | A1 | 2/2022 | Andreu et al. | |
| 2022/0091594 | A1* | 3/2022 | Jetley | G05B 19/41865 |

FOREIGN PATENT DOCUMENTS

| | | |
|---|---|---|
| WO | 2022026121 A1 | 2/2022 |
| WO | 2022/232782 A1 | 11/2022 |

OTHER PUBLICATIONS

International Search Report and Written Opinion for PCT/US2021/040252 dated Oct. 21, 2021, entitled "Projection Methods to Impose Equality Constraints on Algebraic Models".

Vasebi, et al., "Selecting proper uncertainty model for steady-state data reconciliation—Application to mineral and metal processing industries", Minerals Engineering, Elsevier, Amsterdam, N L, vol. 65, Jun. 26, 2014, pp. 130-144, XP029010820, ISSN: 0892-6875, DOI: 10.1016/J.MINENG.2014.06.001, the whole document.

"Parallel solution of the pooling problem with application to the Cell Broadband Engine Architecture", IEEE, Piscataway, NJ, USA, Jul. 6, 2009, pp. 354-359, XP031519756, ISBN: 978-1-4244-4135-8, Section 3.

Hodouin, Daniel, "Process Observers and Data Reconciliation Using Mass and Energy Balance Equations", Jan. 1, 2010, Springer, XP055273741, ISSN: 1430-9491 ISBN: 978-1-85233-959-3, pp. 15-83, DOI: 10.1007/978-1-84996-106-6_2, p. 15-p. 28, p. 33-p. 34, p. 38, last paragraph—p. 52, paragraph 2.

Chia, Tien-Li, "Parameter identificastion and state estimation of constrained systems", May 1, 1985, pp. 1-142, XP055850385, Ann Arbor, United States, Retrieved from the Internet: URL:https://www.proquest.com/docview/303339105?accountid=29404, pp. 3-5, pp. 14-54.

Orth, Jeffrey D., Ines Thiele, and Bernhard 0. Palsson. "What is flux balance analysis?." Nature biotechnology 28.3 (2010): 245-248. (Year: 2010).

Boyd, et al, "Convex Optimization", Cambridge University Press, 2004, 730 pages.

Mah, Richard S.H., "Chemical Process Structures and Information Flows", Butterworth Publishers, 1990, 499 pages.

Dmitry Panchenko, "18.650 Statistics for Applications", Fall 2006. Massachusetts Institute of Technology: MIT OpenCourseWare, https://ocw.mil.edu, License: Creative Commons BY-NC-SA.

International Preliminary Report on Patentability received for PCT Patent Application No. PCT/US2021/040252, dated Feb. 9, 2023, 13 pages.

\* cited by examiner

APPARATUS AND METHODS TO BUILD A RELIABLE DEEP LEARNING CONTROLLER BY IMPOSING MODEL CONSTRAINTS

BACKGROUND

Process engineering industries include industries involved in petroleum processing, chemical processing, pharmaceutical processing, and the like, each with respective processing plants, factories, and industrial processing systems. In process engineering industries, advanced process control (APC) of Self-Optimizing Plant (SOP) or Industry 4.0 is utilized. In traditional APC, a linear regression model of a subject process is derived from the operational data of that subject process. The model is then used by an APC controller to predict and optimize the real time operation of the process. For example, the model can be used to: (i) predict the behavior of the subject process, (ii) identify the dependent variables of the process, (iii) and make changes to the independent variables, so that the controller can keep the subject process running inside a prescribed set of conditions.

For certain process units, a linear model is not adequate to fully capture the process's complex behavior, and the APC controller using a linear model cannot optimize the process to its fullest potential. Recent advancements in modeling methods and computer technology have allowed the use of more sophisticated models, such as models generated by Deep Learning, in APC. These more sophisticated models are able to better represent and predict the behavior of complex systems such as a dynamic nonlinear process unit. Theoretically more accurate and complex models allow for a controller to achieve better optimization performance during APC.

APC controllers (such as those used for Model Predictive Control, or MPC) are closed-loop systems. In contrast to a model used for open-loop prediction purposes, models used in closed-loop systems require certain properties to ensure functionality. These properties include: a) Monotonicity in input-output variable relationship. For example, if a steam flow is an input variable and temperature is an output variable, then increasing input should always result in an increase in output according to physical laws. A model of the aforementioned should exhibit the same behavior. If not, a closed-loop controller may keep increasing the steam flow when the column temperature is too high and push the process to an unprofitable or dangerous condition; and b) Relative strength in input-output relationship. For example, a condenser has two cooling fans and the first fan is twice as powerful as the second fan. This means that the impact to the condenser temperature from the first fan should be twice the impact from the second fan. A model of the aforementioned should exhibit the same behavior. If the relationship presented by the model is not consistent with the physical reality of the modeled process or system, say the second fan shows a stronger impact than the first fan, the action taken by the controller can be erratic causing the process to oscillate.

When a model is derived from operation data of a subject process, due to the uncertainty introduced at least by unmeasurable process disturbances and instrumentation issues, the aforementioned necessary model properties are rarely met automatically. When more sophisticated model generation techniques and structure are used, such as Deep Learning, so-called overfitting and inability to extrapolate can create even worse issues if not carefully identified and dealt with. For example, in certain operating range, the model may show a positive relationship between the steam flow and the column temperature (i.e., increasing steam will increase the temperature), but in a different operating range, the model may show negative relationship between the two variables.

SUMMARY

Sophisticated model structures, such as Deep Learning, are often needed to fully capture the complex behaviors of certain process units so that an APC controller can better optimization performance. However, the use of the process operation data alone cannot typically render a model which has the properties required for creating a reliable closed-loop controller. A need exists for the ability to create complex closed-loop compatible models, and in particular to impose gain constraints such as monotonicity and ratio (gain ratios) on the created model.

During model generation, certain measures must be taken to ensure that the generated model complies with the physical law represented in the process unit. There are two theoretically possible approaches, a one step approach and a two step approach. In the one step approach, the model property requirements are imposed during the model creation and training so that the model is created already satisfying the desired physical laws and relationships. The one step approach involves solving a very complex nonlinear optimization problem often directly incorporating the physical laws and relationships. For a sophisticated model like those created with a Deep Learning network, there is currently no efficient way to solve those problems. Additionally, when the model requirements change, the entire model would need to be recreated and trained.

In the two step approach, model property requirements are not considered during initial model creation and training, but the initial trained model is modified to meet (satisfy) the required properties afterward. The invention disclosed herein focuses on the two step approach and includes an innovative method and associated system able to achieve the model property requirements for APC controllers. Furthermore, the disclosed invention is compatible with a real-time environment and is therefore usable with online control applications.

One example embodiment is a method of creating a controller for an industrial process. The example method includes accessing a model of an industrial process and receiving at least one constraint, the model having been created using operation data of the industrial process. An objective function is constructed based on the received at least one constraint and the accessed model of the industrial process, said constructing being performed by a computer processor. The method further includes solving, by the computer processor, the objective function at an operating point of the industrial process, results of said solving defining a modified model of the industrial process, and based on the modified model, generating a controller that controls the industrial process.

Another example embodiment is a system for controlling an industrial process. The example system includes: (a) a model of an industrial process, the model having been created using operation data of the industrial process and stored in computer memory, (b) an input module or assembly configured to receive at least one constraint, and (c) a computer processor. The computer processor is communicatively coupled to the computer memory and input module. The computer processor is configured to (i) construct an objective function based on the received at least one constraint and the model of the industrial process, and to (ii) solve the objective function at an operating point of the industrial process, results of said solving defining a modified model of the industrial process. The system further includes a controller generated based on the modified model configured to control the industrial process. In embodiments, the controller is responsive to the computer processor.

Another example embodiment is a non-transitory computer-readable data storage medium comprising instructions to cause a computer to: (a) access a model of an industrial process, the model having been created using operation data of the industrial process, and (b) receive at least one constraint. The instructions further cause the computer to construct and solve an objective function based on the received at least one constraint and the accessed model of the industrial process. The solving defines a modified model of the industrial process. Finally, the instructions cause the computer to, based on the modified model, generate a controller that controls the industrial process.

Some embodiments may further include implementing a first move plan for the industrial process from the operating point to an updated operating point and determining if the updated operating point is outside a threshold. Based on the determination, the objective function may be resolved at the updated operating point to create an updated modified model of the industrial process, and based on the updated modified model the controller is updated. These embodiments may further include comparing the measurement data of the industrial process at the updated operating point to a prediction of the industrial process at the updated operating point generated by the modified model and revising, based on the comparison, the updated modified model.

A linear dynamic model of the industrial process localized at the operating point and derived from the modified model may be generated, and in turn, the controller is configured to utilize the linear dynamic model to control the industrial process.

The controller may be configured for closed-loop control of the industrial process including, in some embodiments, Model Predictive Control of the industrial process. The received at least one constraint may include at least one gain constraint. The at least one gain constraint may include at least one of: steady-state gain monotonicity, steady-state gain ratios, and an equality or nonequality linear combination of steady-state gains.

The model of the industrial process may be a deep learning model. The deep learning model can be a recurrent neural network. The industrial process can be a nonlinear system.

The objective function can be a quadradic programming problem. In such embodiments, the programming problem can be $$\min_G \left\| \left(\frac{\partial y}{\partial u}\right)_{(Uc,Ys)} - G \right\|$$

where Ys is an output value, Uc is an input value, in the reference point [Uc, Ys] to calculate the derivatives $$\left(\frac{\partial y}{\partial u}\right),$$

and G is gains. Additionally, in such embodiments the quadradic programming problem may find a solution that minimizes deviation from the accessed model of the industrial process while the received at least one constraint is satisfied.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

New systems and methods are disclosed for building a reliable advanced process controller by imposing control-relevant model properties. The following disclosure is specifically directed to a Deep Learning based controller incorporating steady-state gain constraints. A model's steady-state gain is defined as the derivative of an output variable with respect to an input variable at the steady-state. For example, for a given industrial process (chemical, pharmaceutical, petroleum, or other process), the temperature rises when the steam flow steps up. After a certain time period, the temperature will reach a new steady-state value. The ratio of delta change in temperature over the delta change in steam flow at the steady-state is the steady-state gain for those variables (i.e., temperature and steam flow). The invention disclosed herein can address the following control-relevant model gain constraints: i) steady-state gain monotonicity; ii) steady-state gain ratios; and iii) equality or nonequality linear combination of steady-state gains. Although a Deep Learning model is used as an explicit embodiment of the invention, the methods and systems presented can be applied to other types of linear and nonlinear dynamic models without loss of generality.

The two step approach starts with either creating or accessing an initial model of a subject process created with process operation data. This model may be a simplified linear model built from readily available regular plant operation data or a Deep Learning model, which can more accurately describe the process's behavior, such as severe nonlinearity. The initial model can be generated with any known existing modeling techniques for creating and/or training a model that simulates a subject process unit (process system).

The initial model is then modified to meet pre-defined model property requirements, so the behavior of the model complies to a-prior knowledge of the modeled process. The derivation of a modified model from the initial model is done by solving a Quadratic Programming (QP) problem where the objective function measures the deviation of the modified model gains from the original model gains, subject to pre-defined constraints such as gain constraints. The gain constraints can include the sign (monotonicity), ratios and linear combination of the steady-state gains. The modified model is then fed into the controller engine to calculate the control target of the subject process.

To account for potential nonlinearity of both the subject process and its model, as in the case of an initial Deep Learning model, the QP problem is solved at different operating points and a certain number of iterations are executed to find a true optimum for the process using the nonlinear model. A threshold range or a trust region, for each independent variable, limits how far a variable is permitted to move away from the operating point at which the QP problem is solved and a modified model is created. If the trust region is left, the QP problem is solved again at an updated operating point and an updated modified model is created. This process is repeated as the controller modifies the process's independent variables until the calculated control target or a variable boundary is reached. The calculated target can then be used to generate a new dynamic move plan for the subject process.

To reduce the computation time so the whole calculation can be finished within a specified control cycle (normally one minute), a locally linearized dynamic model may be derived from the deep leaning model at each control cycle and a move plan towards the control target is calculated based on this simplified model. To overcome any deviation between the two step model and the process, real-time feedback is used to update the local linearized dynamic model prediction when the next cycle starts.

Example Network Environment for Plant Processes

Figure 1:
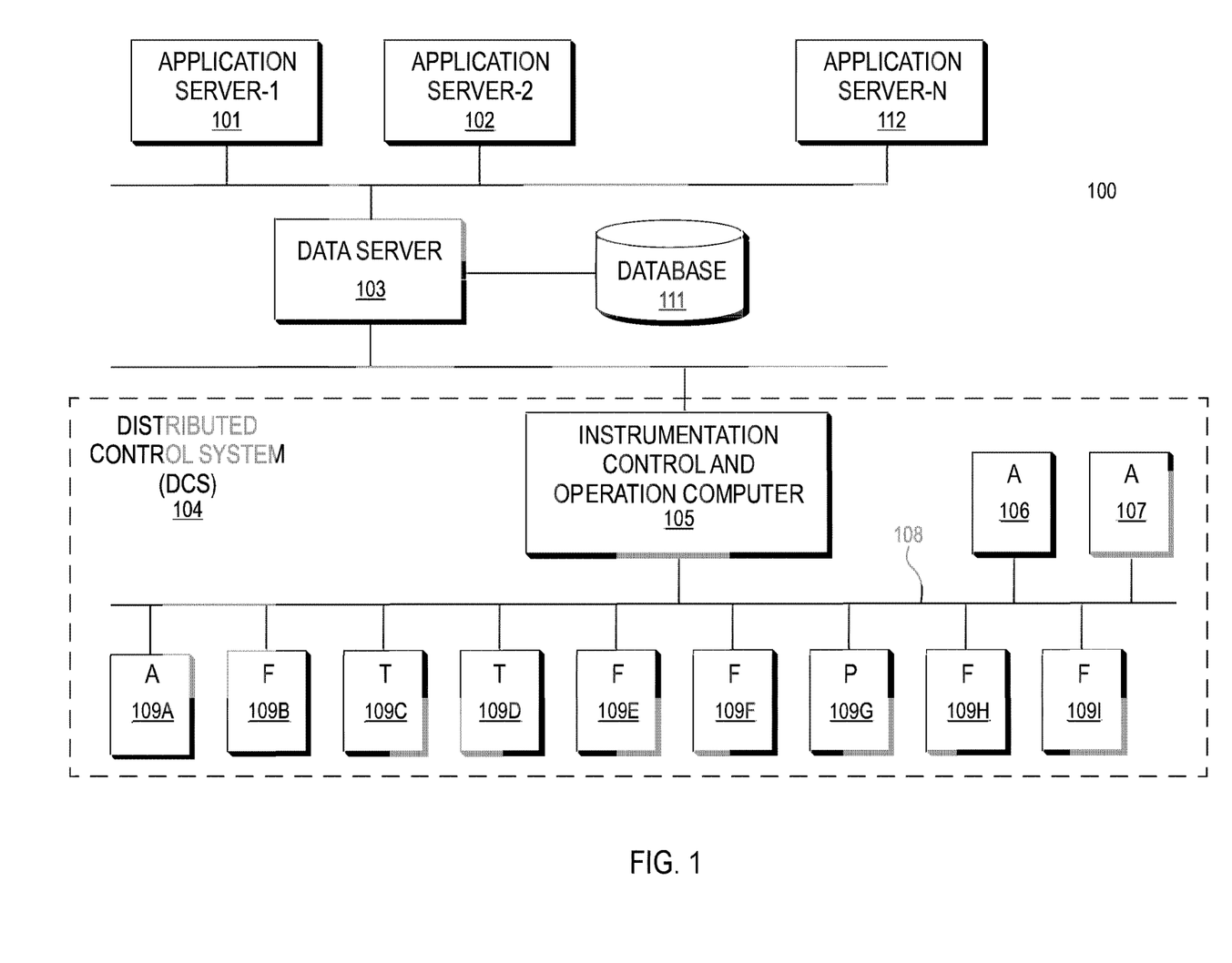
FIG. 1 is a block diagram illustrating an example network environment for data collection, monitoring, and controlling a plant process of the example embodiments disclosed herein.

FIG. 1 illustrates a block diagram depicting an example network environment 100 for monitoring plant processes in many embodiments. System computers 101, 102 may operate as controllers. In some embodiments, each one of the system computers 101, 102 may operate in real-time as a controller alone, or the computers 101, 102 may operate together as distributed processors contributing to real-time operations as a single controller. In other embodiments, additional system computers 112 may also operate as distributed processors contributing to the real-time operation as a controller.

The system computers 101 and 102 may communicate with the data server 103 to access collected data for measurable process variables from a historian database 111. The data server 103 may be further communicatively coupled to a distributed control system (DCS) 104, or any other plant control system, which may be configured with instruments 109A-109I, 106, 107 that collect data at a regular sampling period (e.g., one sample per minute) for the measurable process variables. Instruments 106, 107 are online analyzers (e.g., gas chromatographs) that collect data at a longer sampling period. The instruments 109A-109I, 106, 107 may communicate the collected data to an instrumentation computer 105, also configured in the DCS 104, and the instrumentation computer 105 may in turn communicate the collected data to the data server 103 over communications network 108. The data server 103 may then archive the collected data in the historian database 111 for model calibration and inferential model training purposes. The data collected varies according to the type of target process.

The collected data may include measurements for various measurable process variables. These measurements may include, for example, a feed stream flow rate as measured by a flow meter 109B, a feed stream temperature as measured by a temperature sensor 109C, component feed concentrations as determined by an analyzer 109A, and reflux stream temperature in a pipe as measured by a temperature sensor 109D. The collected data may also include measurements for process output stream variables, such as, for example, the concentration of produced materials, as measured by analyzers 106 and 107. The collected data may further include measurements for manipulated input variables, such as, for example, reflux flow rate as set by valve 109F and determined by flow meter 109H, a re-boiler steam flow rate as set by valve 109E and measured by flow meter 109I, and pressure in a column as controlled by a valve 109G. The collected data reflect the operation conditions of the representative plant during a particular sampling period. The collected data is archived in the historian database 111 for model calibration and inferential model training purposes. The data collected varies according to the type of target process.

The system computers 101 or 102 may execute various types of process controllers for online deployment purposes. The output values generated by the controller(s) on the system computers 101 or 102 may be provided to the instrumentation computer 105 over the network 108 for an operator to view, or may be provided to automatically program any other component of the DCS 104, or any other plant control system or processing system coupled to the DCS system 104. Alternatively, the instrumentation computer 105 can store the historical data 111 through the data server 103 in the historian database 111 and execute the process controller(s) in a stand-alone mode. Collectively, the instrumentation computer 105, the data server 103, and various sensors and output drivers (e.g., 109A-109I, 106, 107) form the DCS 104 and can work together to implement and run the presented application.

The example architecture 100 of the computer system supports the process operation of a representative plant. In this embodiment, the representative plant may be, for example, a refinery or a chemical processing plant having a number of measurable process variables, such as, for example, temperature, pressure, and flow rate variables. It should be understood that in other embodiments a wide variety of other types of technological processes or equipment in the useful arts may be used.

Figure 2:
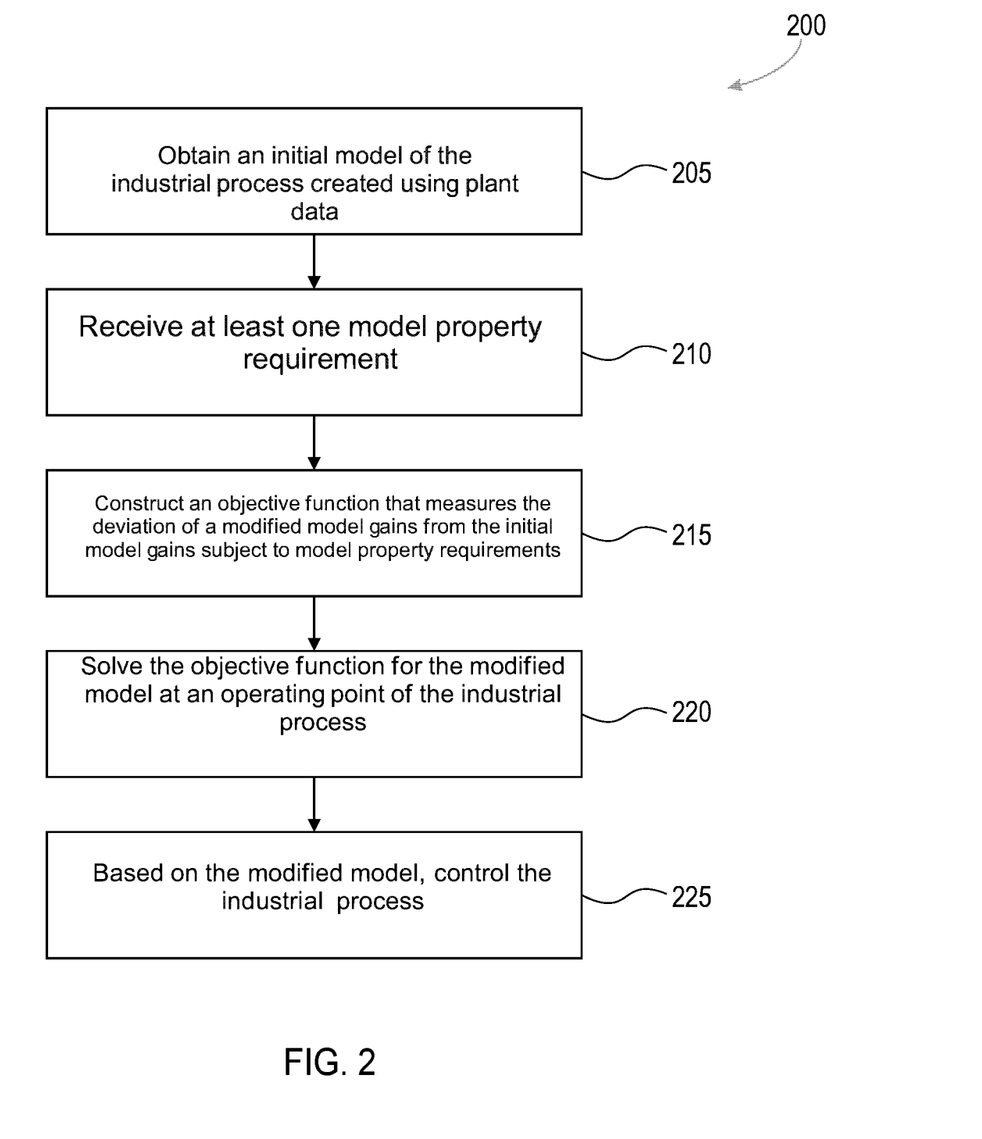
FIG. 2 is a flow diagram illustrating an example method for creating a reliable deep learning controller by imposing model constraints, according to an example embodiment.

FIG. 2 is a flow diagram illustrating an example method 200 for creating a reliable and accurate controller by imposing model constraints, according to an example embodiment. The example method 200 includes obtaining or accessing 205 an initial model of the industrial process created based on the plant data 111 of the industrial process and receiving 210 at least one model property requirement. The initial model obtained in step 205 may be a deep learning model created with conventional deep network training using the industrial process operation data. Alternatively, other types of linear and nonlinear dynamic models may be used as the initial model. The model property requirements received in step 210 capture known limitations of the modeled industrial process. One common set of limitations are gain constraints, including but not limited to, steady-state gain monotonicity (sign), steady-state gain ratios, and equality or nonequality linear combination of steady-state gains.

An objective function is constructed 215 that measures the deviation of a modified model gains (aka the derivative of an output variable with respect to an input variable) from the initial model gains. The objective function also requires that the modified model conforms to the received model property requirements from step 210. The objective function of step 215 may be a Quadratic Programming (QP) objective function. Next, the objective function is solved 220 for a modified model that minimizes gain deviation from the initial model and remains subject to the received model property requirements from step 210. The modified model retains the complexity and predictive power of the initial model while complying with the physical laws and/or process constraints captured in the model property requirements. The objective function is solved 220 at an operating point of the subject industrial process due to the nonlinearity it (the objective function) inherits from the initial model. At the output of step 220 is a deployable modified model. The example method 200 further includes controlling (or enabling control of) 225 the industrial process based on the modified model from step 220 (such as by servers 101, 102 executing a process controller employing the modified model).

A digital processor may be programmed to implement the steps 205, 210, 215, 220 of method 200 and may be in communication with servers 101, 102, 112 for carrying out step 225. In other embodiments, servers 101, 102, and/or 112 are configured to perform the steps of method 200. Computer processors perform method 200 upon user command, with or without user intermittent interaction, automatically, and the like, given the disclosure herein.

Figure 3:
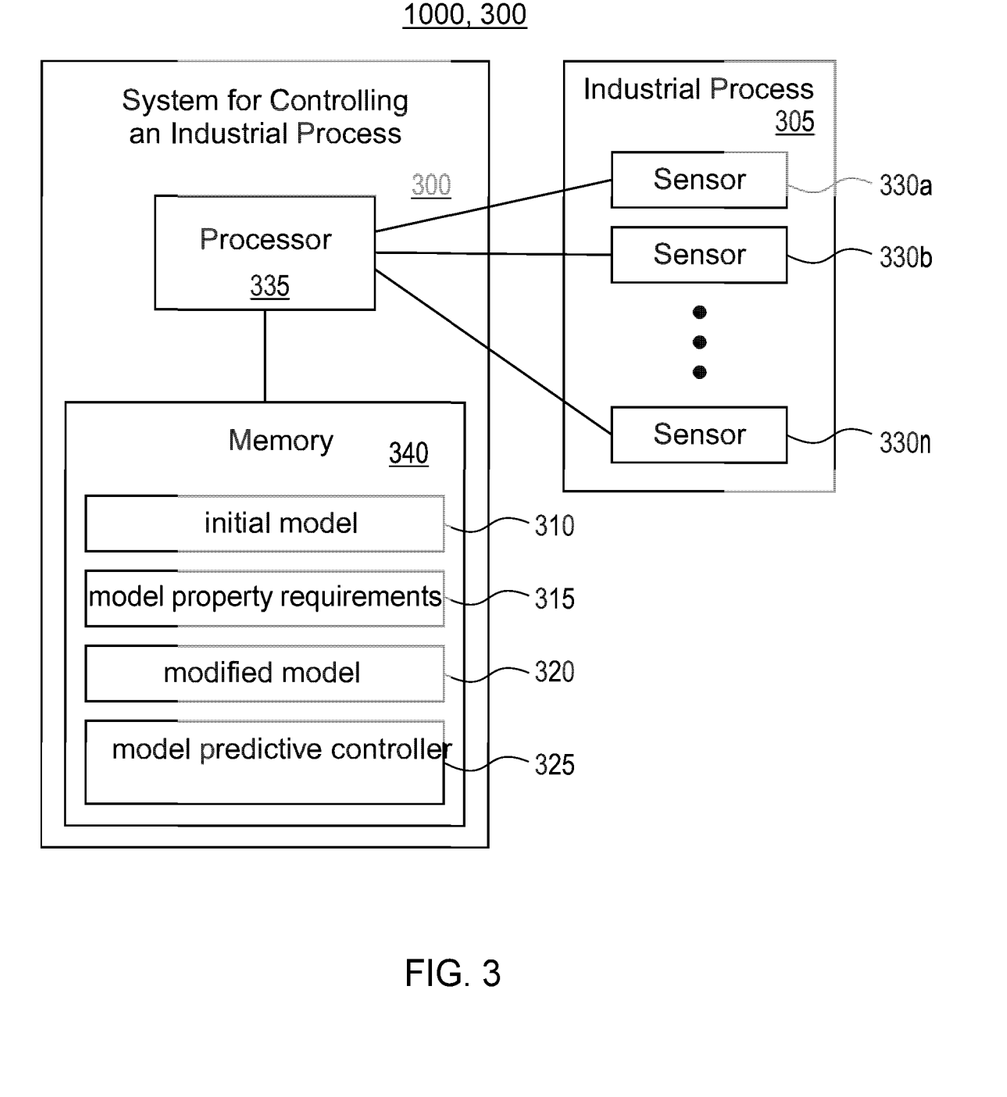
FIG. 3 is a block diagram illustrating a system for controlling an industrial process, according to an example embodiment.

FIG. 3 is a block diagram illustrating a system 300 for controlling an industrial process 305 by employing method 200, according to an example embodiment. The example system 300 includes an initial model 310 of the industrial process 305, model property requirements 315, a modified model 320 of the industrial process 305, and a predictive controller 325. Processor 335 is configured to generate and solve an objective function based on the initial model 310 and model property requirements 315 to derive modified model 320. Processor 335 may additionally be configured to generate and train initial model 310 from data of industrial process 305 collected by sensors 330a-n (i.e., instruments 109A-109D, 109H-109I, 106, 107 of FIG. 1). Computer processor 335 may additionally be configured to receive model property requirements from a user of System 300, such as through an input module or assembly. The model predictive controller 325 is configured to control the industrial process 305 using modified model 320. The initial model 310, model property requirements 315, modified model 320, and model predictive controller 325 can be stored in memory 340, and implemented using a processor 335 of the system 300. Processor 335 may be further configured to use real-time feedback from sensors 330a-n to update modified model 320 to correct any deviation between the predictions of modified model 320 (as used by model predictive controller 325) and industrial process 305.

Figure 4:
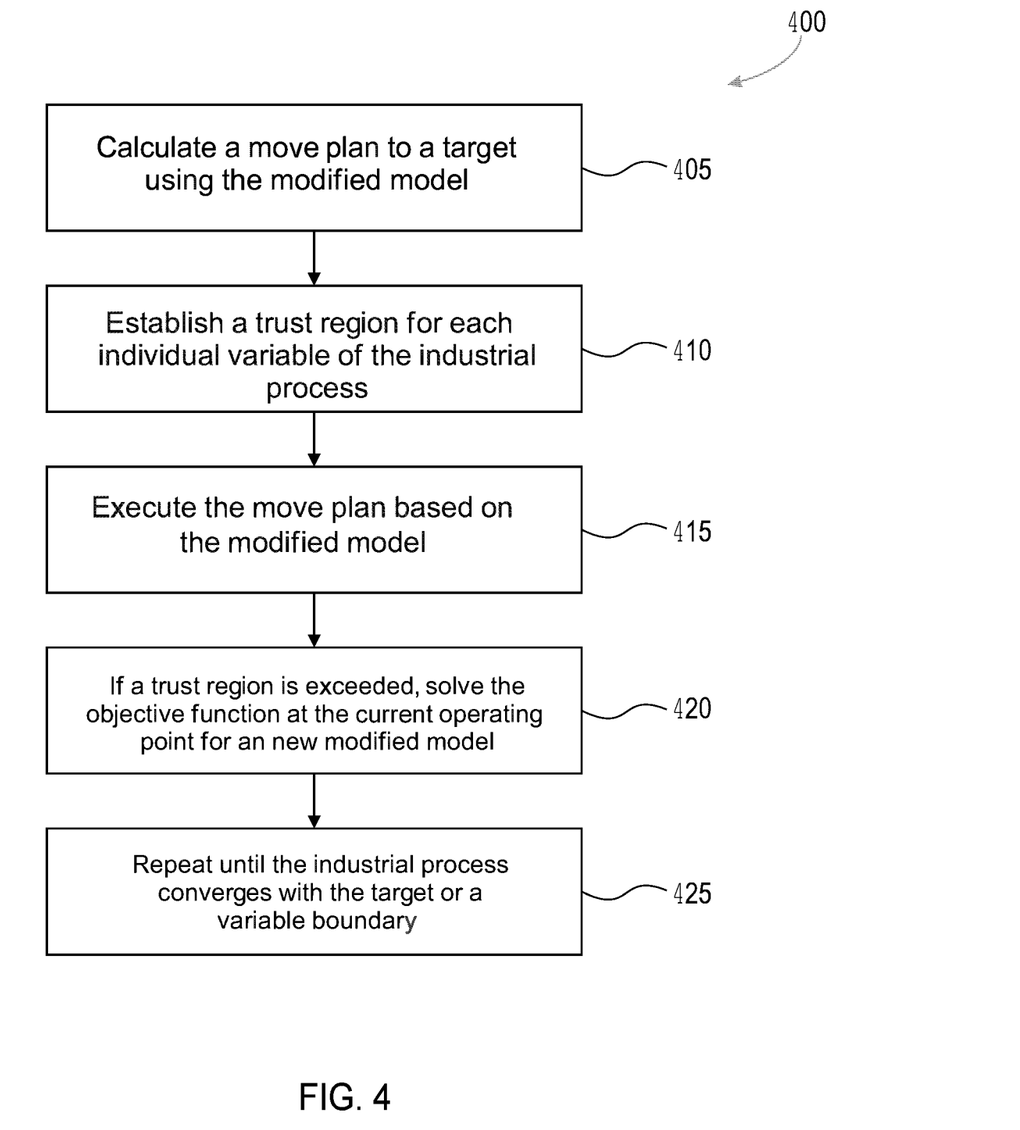
FIG. 4 is a flow diagram illustrating an example method for executing a move plan for the industrial process according to an example embodiment.

FIG. 4 is a flow diagram illustrating an example method 400 for executing a move plan for the industrial process according to an example embodiment. The move plan utilizes the modified model (or updated model) 320 in a controller from system 300 and method 200. The example method 400 includes calculating 405 a move plan to a target using the modified model. The target can be specific variable values of the industrial process such as settings for valves, target temperature, pressure, flow rate, etc. at instruments 109A-109I, 106, 107. These targets may be External Targets supplied by an outside APC. The modified model can be the modified model created in step 220 of method 200. The modified model may be fed into a controller engine at application servers 101, 102, 112 or at a processor of system 300 to calculate the target and to best control the subject process 305 to reach that target.

The method 400 further includes establishing 410 a trust region for each variable of the industrial process 305. A trust region is a threshold range surrounding the value of the variable at the operating point the objective function was solved at. The trust region, in some embodiments, can be 10% of the operating range for the independent variable, the method may adaptively increase or decrease the region to speed convergence. If the industrial process (outputs and monitored variable values/sensor values) remains within that threshold range, the predictions and calculations of the modified model will be accurate. However, if the industrial process (outputs and monitored variable values/sensor values) exceeds the threshold range, there is no guarantee that the predictions and calculations of the modified model will be accurate at the current cycle. When next cycle starts, feedback information can be incorporated and the calculation will be updated to improve accuracy.

The move plan is executed 415 based on the predictions and calculations of the modified model. If the trust region is exceeded, the method includes solving 420 the objective function again at the current operating point of the industrial process to create a new modified model. Using the new modified model resulting from step 420, method 400 iterates steps 405, 410, 415, and 420 as shown at 425 in FIG. 4. The steps 405, 410, 415, and 420 are repeated 425 until the industrial process 305 (outputs and variable values/sensor values) converges with the target or a variable boundary is reached. A certain number of iterations are often executed to find a true optimum of the nonlinear model and the industrial process 305 it represents.

Method 400 produces a dynamic process where a move plan for the subject industrial process 305 is executed utilizing a model that is ensured to be accurate for the current operating point of the industrial process and also satisfies the model property requirements incorporated in the objective function. Once the industrial process 305 reaches the target, a new target and corresponding move plan may be determined based on the needs of a user or system control plan.

To reduce the computation time so all the necessary calculations can be finished within a specified control cycle (normally one minute), a locally linearized dynamic model may be derived from the modified model at each control cycle and the move plan is calculated based on this simplified model (the derived locally linearized dynamic model).

Details of an Example Embodiment

A generic dynamic process (representative of subject industrial processes 305 of FIGS. 1-3) can be described as:

$$Y(k)=F((Y_0,U(k),\ldots,U(k-N))) \quad (1)$$

Where, F is a linear or nonlinear function, k is time, N is the dynamic memory length, $Y_0$ is the initial condition, and U and Y are input variables and output variables, respectively.

$$U=[u_1,u_2,\ldots,u_m], m\geq 1$$

$$Y=[y_1,y_2,\ldots,y_n], n\geq 1$$

For a nonlinear system, the gain value, $g_{ij}$, varies at different initial condition $Y_0$.

The process operation constraints can be described as:

$$UL \leq U \leq UH \quad (2)$$

$$YL \leq Y \leq YH \quad (3)$$

Where, UL and UH are input variable low and high limits, and YL and YH are output variable low and high limits, respectively.

For a linear dynamic process, equation (1) can be rewritten as $$Y(k) = \sum_{t=0}^{N} C(t) * U(k-t) \quad (4)$$

Where C is a series of coefficients.

Figure 5:
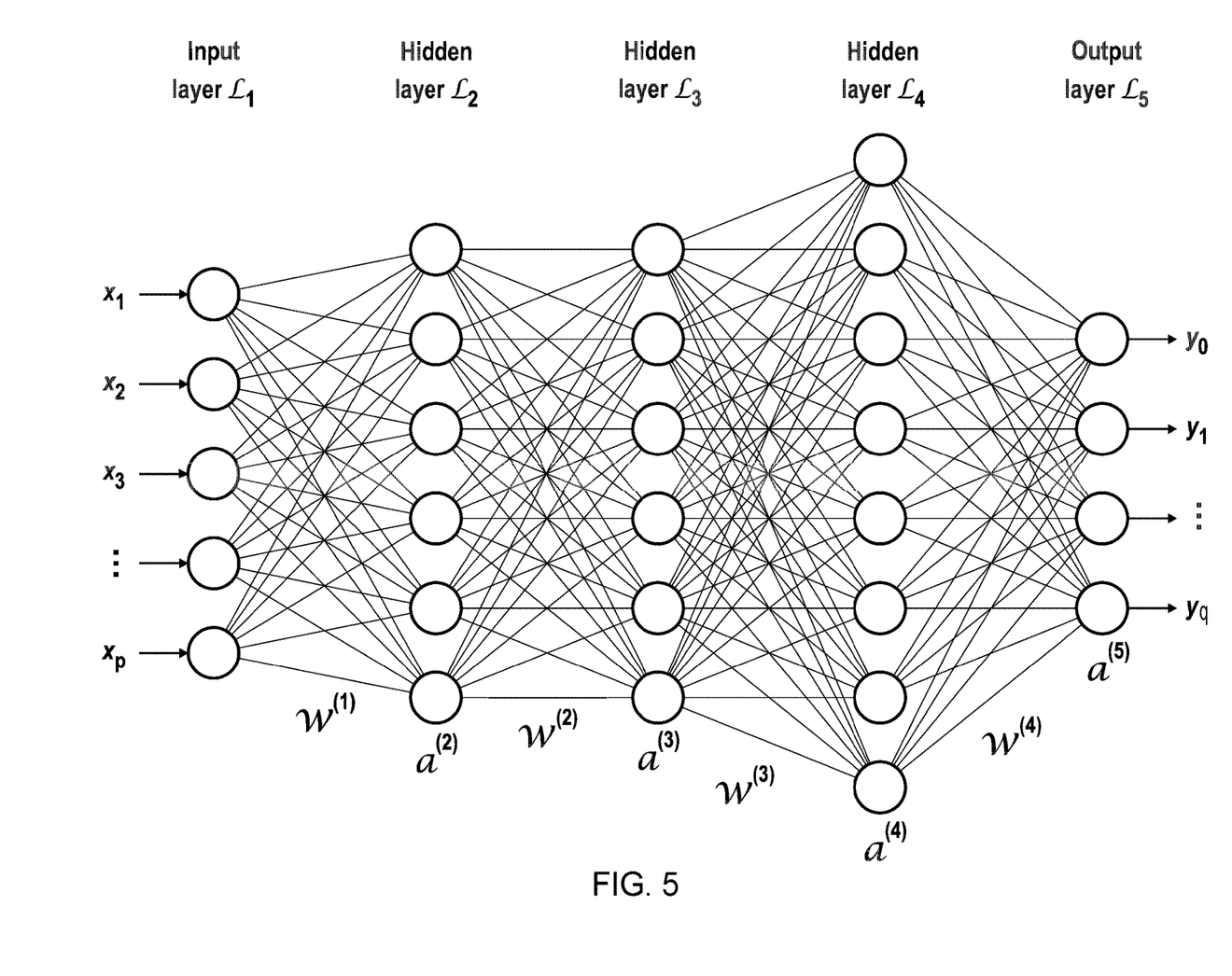
FIG. 5 is a schematic diagram illustrating a Deep Learning model.

For a nonlinear dynamic process, a possible representation can be a Deep Learning model as illustrated in FIG. 5. As shown in FIG. 5, inputs $x_1, \ldots, x_p$ initially enter the Deep Learning model at Input layer $L_1$. Weights $w^{(1)}$ are applied to the input values $x_1, \ldots, x_p$, and the products $x_i w^{(1)}$ summed across i=1 ... p are used to form nodes $a^{(2)}$ at Hidden layer $L_2$. Each successive Hidden layer $L_3$, $L_4$ has respective nodes $a^{(3)}$, $a^{(4)}$ formed by weighted sums of the immediate prior layer L node values multiplied by respective weights $w^{(3)}$, $w^{(4)}$ as illustrated in FIG. 5. The Output layer $L_5$ is formed of nodes $a^{(5)}$. Each node $a^{(5)}$ has a value defined by the weighted sum of each node $a^{(4)}$ multiplied by weight $w^{(4)}$. The nodes $a^{(5)}$ of Output layer $L_5$ generate output values $y_0, \ldots, y_q$.

The goal of an advanced process controller, particularly in MPC, is to find a sequence of process inputs so that the process outputs satisfy the process constraints while a predefined objective function J is optimized:

$$\min_{U} J(U, Y) \quad (5)$$

such that Equations or relationships (1), (2), and (3) hold true.

If the optimization solution from equation (5) can be reliably applied to an industrial process, model (1) must satisfy certain properties. Many of these properties are constraints on the input-output steady-state gain. An input-output steady-state gain is defined as $$g_{ij} = \left(\frac{\partial y_j(k)}{\partial u_i(k-N)}\right)\Big|_{(u_i(k-N)=u_i(k-N+1)=\ldots=u_i(k),0 \text{ for other input})} \quad (6)$$

Equation (6) states that if there is a step change in one of input variables i while keeping other input variables constant, the ratio of output value j net change at steady state over the input step change is the gain, $g_{ij}$.

Gain monotonicity: either $g_{ij} \geq 0$ or $g_{ij} \leq 0$ across the whole operating range, unless certain variables truly exhibit gain sign change behavior presented in the process unit (subject industrial process).

Gain ratio constraint: commonly used gain ratio constraints include $$\frac{g_{ij}}{g_{il}} = c$$

for a specific i, j≠l where c can be a known constant or unknown. This type of constraint is often called parallel input constraint.

$$\frac{g_{ij}}{g_{lj}} = c$$

for a specific j, i≠l where c can be a known constant or unknown. This type of constraint is often called parallel output constraint.

General gain constraint: $\Sigma_{\{i,j\}} c_{i,j} * g_{i,j} = d$ for a subset of variables, where $c_{i,j}$ and d are given constants.

The following describes how these gain constraints can be imposed on a Deep Learning model based advanced process control system (MPC in particular).

Step 1: Create an Unconstrained Deep Learning model.

The input and output variables of an industrial process required to achieve closed-loop control of an industrial process unit are selected. Using process operation data, a conventional Deep Learning model for the process unit is generated and trained. In some cases, designed perturbation is used to enrich the operation data for better training. A recurrent neural network such as Long Short-Term Memory (LSTM) is normally used to capture the complextity of the process dynamics. During Step 1, no constraints are considered in the model training.

Step 2: Define Constraints.

Based on a-priori knowledge about the modeled process unit, a user specifies the model gain constraints relevant to the closed-loop control requirement. These constraints may include: gain monotonicity, gain ratios, and the linear combination.

Step 3: Build a Deep Learning Controller.

Model predictive control involves two major calculations: a steady-state target determination, and a dynamic move plan calculation. To use a Deep Learning model, Applicants have derived a new algorithm to overcome the complexity involved in nonlinear optimization so that the model can be deployed in real time application:

1) Choose a maximal allowed step fraction, a, for the input and output variables, where 0<a≤1.

2) Calculate the local derivatives from the Deep Learning model: Let U(k+1)=U(k+2)= ... =U(k+N)=Uc, calculate the Deep Learning output values Ys at k+N. Use [Uc, Ys] as the reference point to calculate the numerical derivatives, $$\frac{\partial y}{\partial u},$$

from the Deep Learning model.

3) Imposing the pre-defined gain constraints: modify the original derivatives, $$\left(\frac{\partial y}{\partial u}\right)_{(Uc,Ys)},$$

so that the modified derivatives (aka gains), G, satisfy the gain constraint requirement. Refer to Step 4 below for more details.

4) Run optimization problem Equation (5) using a locally linearized model:

$$Y = Ys + G*U \quad (7)$$

with the following additional constraints:

$$|U-Uc| \leq (UH-UL)*a$$

$$|Y-Ys| \leq (YH-YL)*a \quad (8)$$

Denote the solution as [Ua, Ya].

5) Using [Ua, Ya] as the reference point to calculate the local derivatives from the Deep Learning model, and then return to 3) above to calculate the modified derivatives. Stop if the required convergence is reached.

6) Create a locally linearized dynamic model: Generate a step response curve from the Deep Learning model by making a delta change in each of the inputs U, one at a time. The delta change direction is determined by the sign of (Ua–Uc). The gain of the step response curve is determined by $$G = \frac{Ya - Ys}{Ua - Uc} \quad (9)$$

To ensure that the locally linearized dynamic model is consistent with the steady state target and the gain constraints, a QP is solved with the following structure:

$$\min_{Gopt} \|G - Gopt\| \quad (10)$$

such that $$\sum_{(i,j)} (Uopt - Uinit) * g_{ij} = Yopt - Yinit \quad (11)$$

Where Gopt is the steady-state gains of the linearized dynamic model used for the dynamic move plan calculation, Uinit is the initial input, Yinit is the initial output, Uopt is the input target, and Yopt is the output target.

7) Calculate Dynamic Move Plan: Follow a conventional approach in Model Predictive Control to calculate a dynamic move plan using the linearized model Equation (9).

Step 4: Imposing Model Constraints.

When the numeric derivatives, $$\left(\frac{\partial y}{\partial u}\right)_{(Uc, Ys)},$$

is obtained from the Deep Learning model, the following QP problem is formulated with the specified gain constraints:

$$\min_{G} \left\|\left(\frac{\partial y}{\partial u}\right)_{(Uc, Ys)} - G\right\| \quad (12)$$

such that $gl_{\{ij\}} \leq g_{\{ij\}} \leq gh_{\{ij\}}$ for subset of variables, where $gl_{\{ij\}}$ and $gh_{\{ij\}}$ are given constants (13)

$\Sigma_{(i,j)} c_{ij} * g_{ij} = 0$ for subset of variables, where $c_{ij}$ are given constants (14)

$$\frac{g_{i1j1}}{g_{i2j2}} = \frac{g_{i3j3}}{g_{i4j4}} \text{ for subset of variables} \quad (15)$$

This QP problem aims to find a new gain matrix that defines a modified model such that the specified gain constraints are satisfied while the deviations from the original gains (derivatives) are minimized. Imposing constraints such as those in (13), (14) and (15) need to be done based on the understanding of the modeled process unit; unnecessary constraints can introduce modeling errors.

Step 5: Output Results and Feedback Update

Upon the completion of the calculaton, only the first changes in the move plan (a series of input variable changes over the control time horizon) is sent to the process unit to be implemented. A new set of target and move plan is calculated when the next control cycle starts. Before the new control cycle starts, measurements from the process unit are collected (for example from sensors 330*a*, . . . , 330*n*, or analyzers and sensors 109A-109D, 109H, 109I, 106, 107 described in FIGS. 1 and 3) and compared to the predicted values. The mismatch between the measurement (sensor measured value of a subject variable) and prediction (model predicted value of the subject variable) is used to update the current Deep Learning model (i.e., initial working Deep Learning model after the first control cycle, first time updated (the modified) Deep Learning model after the second control cycle, second time updated Deep Learning model after the third control cycle, and so on).

Example Digital Processing Environment

Figure 6:
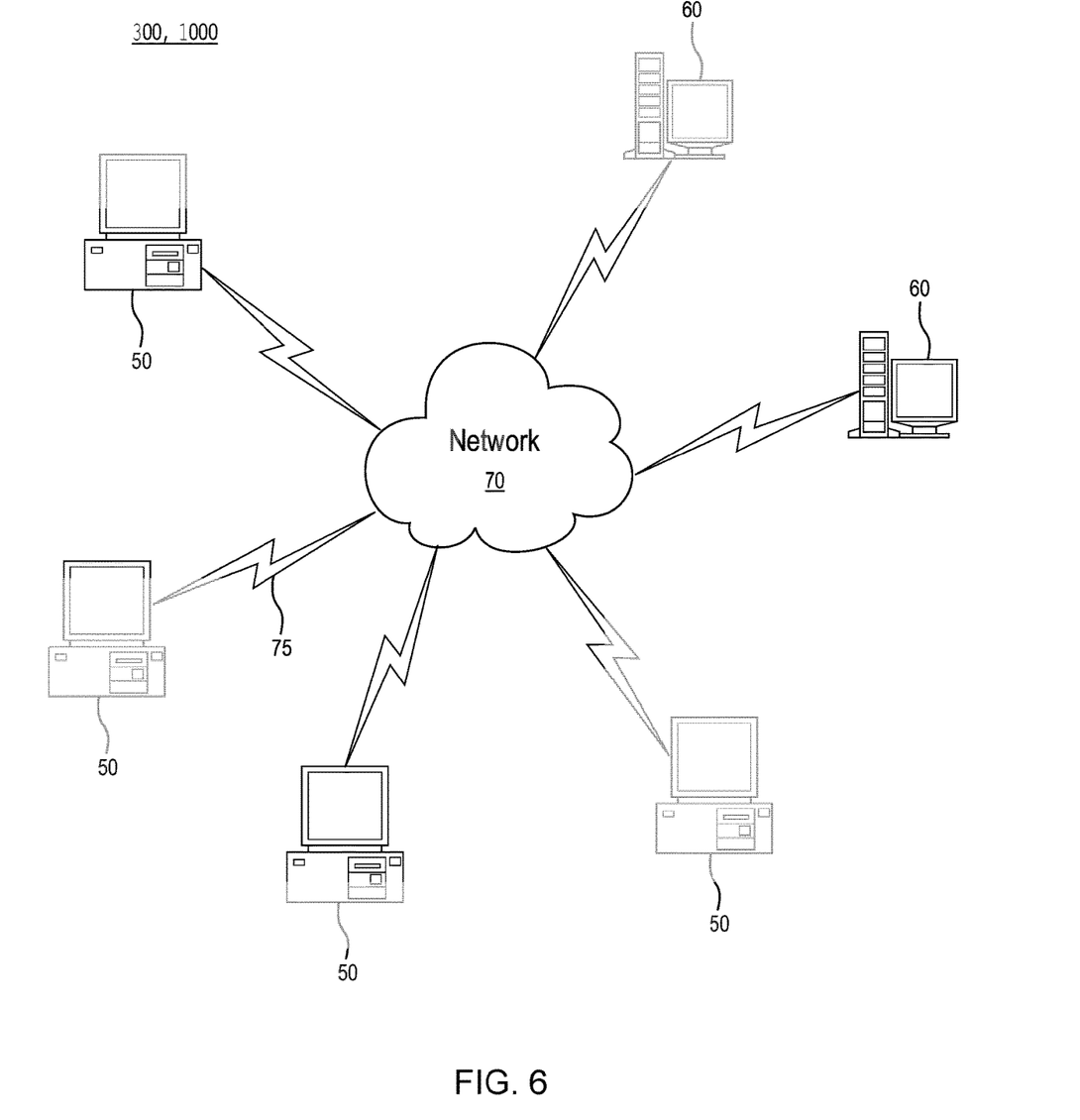
FIG. 6 is a schematic view of a computer network in which embodiments can be implemented.

FIG. 6 illustrates a computer network or similar digital processing environment in which the disclosed embodiments 100, 300, 1000 may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 7:
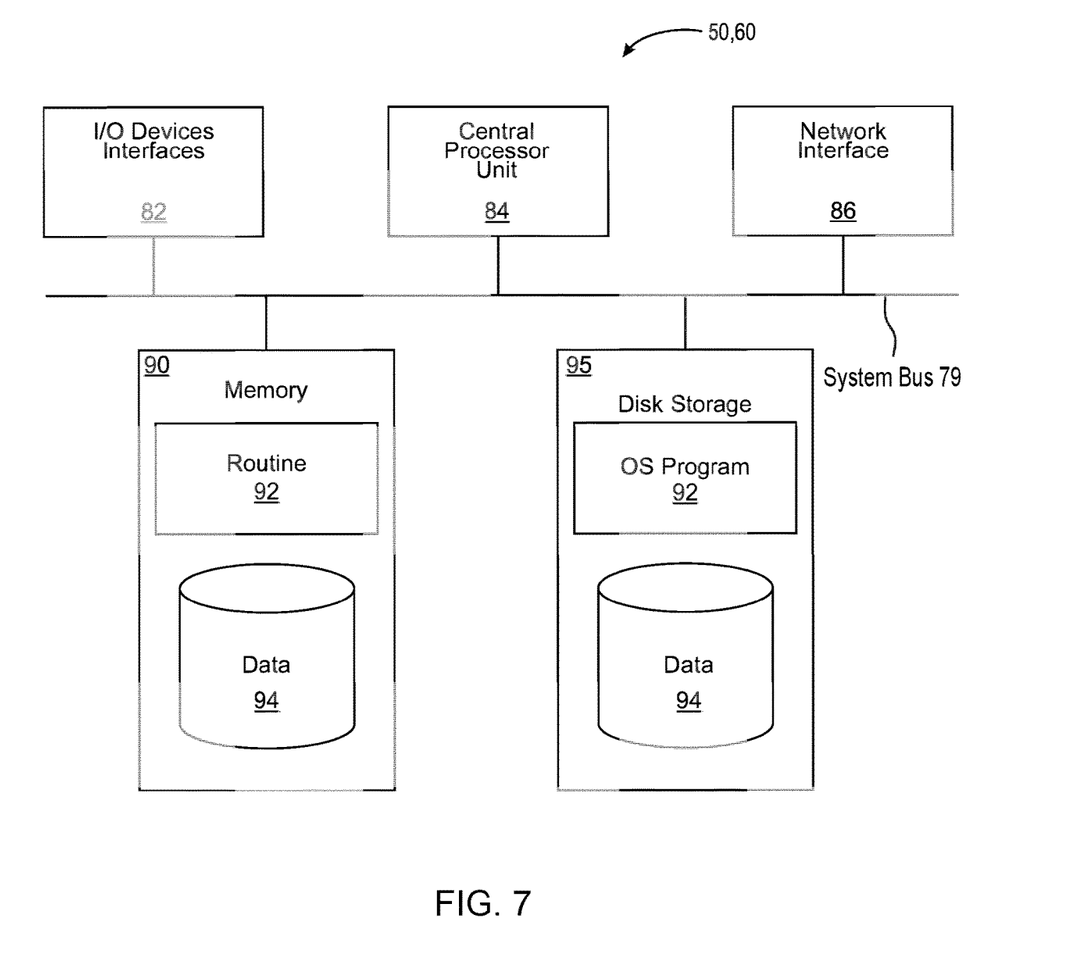
FIG. 7 is a block diagram of a computer node or device in the computer network of FIG. 6.

FIG. 7 is a block diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or digital processing system. Bus 79 is essentially a shared conduit that connects different elements of a computer system (e.g., processor, disk storage, memory, input/output ports, network ports) that enables the transfer of information between the elements. Attached to system bus 79 is I/O device interface 82 for connecting various input and output devices (e.g., keyboard, mouse, displays, printers, speakers) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment (e.g., method 200 of FIG. 2, modules 310, 315, 320, and 325 of FIG. 3, method 400 of FIG. 4, and the Deep Learning architecture of FIG. 5). Disk storage 95 provides non-volatile storage for computer software instructions 92 and data 94 used to implement an embodiment. Data 94 may include plant operating plans, plant scheduling plans, datasets of operating and/or scheduling plan data cases, PCA models, instructions for clustering techniques, hierarchical clustering structures, metadata structures, and so forth as previously discussed. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes) that provides at least a portion of the software instructions for the disclosed system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 75 (FIG. 6) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

It should be understood that the flow diagrams, block diagrams, and network diagrams may include more or fewer elements, be arranged differently, or be represented differently. But further it should be understood that certain implementations may dictate the block and network diagrams and the number of block and network diagrams illustrating the execution of the embodiments be implemented in a particular way. Accordingly, further embodiments may also be implemented in a variety of computer architectures, physical, virtual, cloud computers, and/or some combination thereof, and, thus, the data processors described herein are intended for purposes of illustration only and not as limitations of the embodiments.

While example embodiments have been particularly shown and described, it will be understood by those skilled in the art that various changes in form and details may be made therein without departing from the scope of the embodiments encompassed by the appended claims.

What is claimed is:

1. A method of creating a controller for an industrial process, the method comprising:
accessing a model of an industrial process, the model having been created using operation data of the industrial process;
receiving at least one constraint;
constructing an objective function based on the received at least one constraint and the accessed model of the industrial process, said constructing being performed by a computer processor;
solving, by the computer processor, the objective function at an operating point of the industrial process, results of said solving defining a modified model of the industrial process;
based on the modified model, generating a controller that controls the industrial process;
implementing, using the generated controller, a first move plan for the industrial process from the operating point to an updated operating point;
determining if the updated operating point is outside a threshold;
resolving, based on the determination, the objective function at the updated operating point to create an updated modified model of the industrial process; and
based on the updated modified model updating the controller.

2. The method of claim 1 further comprising:
collecting measurement data of the industrial process at the updated operating point;
comparing the measurement data of the industrial process at the updated operating point to a prediction of the industrial process at the updated operating point generated by the modified model; and
revising, based on the comparison, the updated modified model.

3. The method of claim 1 further comprising:
generating a linear dynamic model of the industrial process localized at the operating point and derived from the modified model; and
wherein the controller utilizes the linear dynamic model to control the industrial process.

4. The method of claim 1 wherein the controller is configured for closed-loop control of the industrial process.

5. The method of claim 4 wherein the controller is further configured for Model Predictive Control of the industrial process.

6. The method of claim 1 wherein the received at least one constraint includes at least one gain constraint.

7. The method of claim 6 wherein the at least one gain constraint includes at least one of steady-state gain monotonicity, steady-state gain ratios, and equality or nonequality linear combination of steady-state gains.

8. The method of claim 1 wherein the accessed model of the industrial process is a deep learning model.

9. The method of claim 8 wherein the deep learning model is a recurrent neural network.

10. The method of claim 1 wherein the industrial process is a nonlinear system.

11. The method of claim 1 wherein the objective function is a quadradic programming problem.

12. The method of claim 11 wherein the quadradic programming problem is:

$$\min_{G} \left\| \left(\frac{\partial y}{\partial u}\right)_{(U_c, Y_s)} - G \right\|$$

where Ys is an output value, Uc is an input value, in the reference point [Uc, Ys] to calculate the derivatives $$\left(\frac{\partial y}{\partial u}\right),$$

and G is gains.

13. The method of claim 11 wherein the quadradic programming problem finds a solution that minimizes deviation from the accessed model of the industrial process while the received at least one constraint is satisfied.

14. A system for controlling an industrial process, the system comprising:
   a model of an industrial process, the model having been created using operation data of the industrial process and stored in computer memory;
   an input module configured to receive at least one constraint;
   a computer processor communicatively coupled to the input module and the computer memory, the computer processor configured to:
      construct an objective function based on the received at least one constraint and the model of the industrial process;
      solve the objective function at an operating point of the industrial process, results of said solving defining a modified model of the industrial process;
   a controller responsive to the computer processor and generated based on the modified model configured to control the industrial process and to implement a first move plan for the industrial process from the operating point to an updated operating point; and
   the computer processor is further configured to:
      determine if the updated operating point is outside a threshold;
      resolve, based on the determination, the objective function at the updated operating point to create an updated modified model of the industrial process; and
      update, based on the updated modified model, the controller.

15. The system of claim 14 wherein the computer processor is further configured to compare measurement data of the industrial process at the updated operating point to a prediction of the industrial process at the updated operating point generated by the modified model, and based, on the comparison, revise the updated modified model.

16. The system of claim 14 wherein the computer processor is further configured generate a linear dynamic model of the industrial process localized at the operating point and derived from the modified model and the controller is further configured to utilize the linear dynamic model to control the industrial process.

17. The system of claim 14 wherein the controller is a closed-loop controller.

18. The system of claim 17 wherein the controller is a Model Predictive Control controller.

19. The system of claim 14 the received at least one constraint includes at least one gain constraint.

20. The system of claim 19 wherein the at least one gain constraint includes at least one of steady-state gain monotonicity, steady-state gain ratios, and equality or nonequality linear combination of steady-state gains.

21. The system of claim 19 the model of the industrial process is a deep learning model.

22. The system of claim 21 the deep learning model is a recurrent neural network.

23. The system of claim 14 wherein the industrial process is a nonlinear system.

24. The system of claim 14 wherein the objective function is a quadradic programming problem.

25. The system of claim 24 wherein the quadradic programming problem is:

$$\min_G \left\| \left(\frac{\partial y}{\partial u}\right)_{(Uc,Ys)} - G \right\|$$

where Ys is an output value, Uc is an input value, in the reference point [Uc, Ys] to calculate the derivatives $$\left(\frac{\partial y}{\partial u}\right),$$

and G is gains.

26. The system of claim 25 wherein the quadradic programming problem finds a solution that minimizes deviation from the model of the industrial process while the received at least one constraint is satisfied.

27. A non-transitory computer-readable data storage medium comprising instructions to cause a computer to:
   access a model of an industrial process, the model having been created using operation data of the industrial process;
   receive at least one constraint;
   construct an objective function based on the received at least one constraint and the accessed model of the industrial process, said constructing being performed by a computer processor;
   solve the objective function at an operating point of the industrial process, results of said solving defining a modified model of the industrial process;
   based on the modified model, generate a controller that controls the industrial process;
   implement, using the generated controller, a first move plan for the industrial process from the operating point to an updated operating point;
   determine if the updated operating point is outside a threshold;
   resolve, based on the determination, the objective function at the updated operating point to create an updated modified model of the industrial process; and
   based on the updated modified model update the controller.

* * * * *